(12) United States Patent
Katta et al.

(10) Patent No.: US 10,169,825 B2
(45) Date of Patent: Jan. 1, 2019

(54) SYSTEM AND METHOD FOR PROCESSING VEHICLE REQUESTS

(71) Applicant: Smartcar, Inc., Mountain View, CA (US)

(72) Inventors: Sanketh Suresh Katta, Mountain View, CA (US); Sahas Suresh Katta, Mountain View, CA (US)

(73) Assignee: Smartcar, Inc., Mountain View, CA (US)

( * ) Notice: Subject to any disclaimer, the term of this patent is extended or adjusted under 35 U.S.C. 154(b) by 0 days.

(21) Appl. No.: 15/828,964

(22) Filed: Dec. 1, 2017

(65) Prior Publication Data

US 2018/0158263 A1  Jun. 7, 2018

Related U.S. Application Data

(62) Division of application No. 15/372,257, filed on Dec. 7, 2016, now Pat. No. 9,870,656.

(60) Provisional application No. 62/264,540, filed on Dec. 8, 2015.

(51) Int. Cl.
   *G07C 5/08* (2006.01)
   *G06Q 40/08* (2012.01)
   *G07C 5/00* (2006.01)

(52) U.S. Cl.
   CPC ............ *G06Q 40/08* (2013.01); *G07C 5/085* (2013.01); *G07C 5/008* (2013.01); *G07C 5/0825* (2013.01)

(58) Field of Classification Search
   CPC ....... G07C 5/0841; G07C 5/008; G06Q 40/08
   USPC ........................................................ 701/29.6
   See application file for complete search history.

(56) References Cited

U.S. PATENT DOCUMENTS

| | | | |
|---|---|---|---|
| 6,609,051 B2 | 8/2003 | Fiechter et al. | |
| 7,039,510 B2 | 5/2006 | Gumpinger | |
| 7,917,253 B2* | 3/2011 | Inbarajan | G07C 5/008 340/933 |
| 8,180,908 B2 | 5/2012 | Zoller et al. | |
| 8,468,057 B2 | 6/2013 | Ross et al. | |
| 9,008,906 B2 | 4/2015 | Ricci | |
| 9,292,978 B2 | 3/2016 | Hunt | |
| 2004/0138790 A1* | 7/2004 | Kapolka | G06Q 10/08 701/29.3 |
| 2005/0162309 A1 | 7/2005 | Humphries et al. | |
| 2007/0150139 A1* | 6/2007 | Hardy | G01C 22/02 701/521 |
| 2009/0292418 A1* | 11/2009 | Kuykendal | G07C 5/085 701/33.4 |
| 2011/0082621 A1 | 4/2011 | Berkobin et al. | |
| 2011/0130893 A1 | 6/2011 | Gilleland et al. | |
| 2011/0215899 A1* | 9/2011 | Van Wiemeersch | B60R 25/04 340/5.24 |
| 2012/0072244 A1 | 3/2012 | Collins et al. | |
| 2014/0136012 A1* | 5/2014 | Tam | G08G 1/20 701/1 |
| 2014/0278061 A1 | 9/2014 | Michael | |
| 2014/0282841 A1 | 9/2014 | Kurosawa | |

(Continued)

*Primary Examiner* — Isaac G Smith

(74) *Attorney, Agent, or Firm* — Jeffrey Schox; Diana Lin

(57) ABSTRACT

A method and system for processing requests for vehicular data, including receiving a vehicle request for a vehicle parameter from a client system (e.g., third party application); verifying client access to the vehicle parameter; determining one or more parameter values for the requested vehicle parameter; and transmitting the one or more parameter values to the client system.

20 Claims, 10 Drawing Sheets

(56) References Cited

U.S. PATENT DOCUMENTS

| | | | |
|---|---|---|---|
| 2015/0224963 A1* | 8/2015 | Poder | B60R 25/102 340/426.13 |
| 2016/0042577 A1* | 2/2016 | Chronowski | G07C 5/008 701/29.3 |
| 2016/0071333 A1 | 3/2016 | Haidar et al. | |
| 2017/0140603 A1 | 5/2017 | Ricci | |

* cited by examiner

SYSTEM AND METHOD FOR PROCESSING VEHICLE REQUESTS

CROSS-REFERENCE TO RELATED APPLICATIONS

This application is a divisional of U.S. patent application Ser. No. 15/372,257, filed 7 Dec. 2016, which claims the benefit of U.S. Provisional Application Ser. No. 62/264,540, filed 8 Dec. 2015, both of which are incorporated in their entirety by this reference.

TECHNICAL FIELD

This invention relates generally to the vehicle data field, and more specifically to a new and useful system and method for vehicle request processing in the vehicle data field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
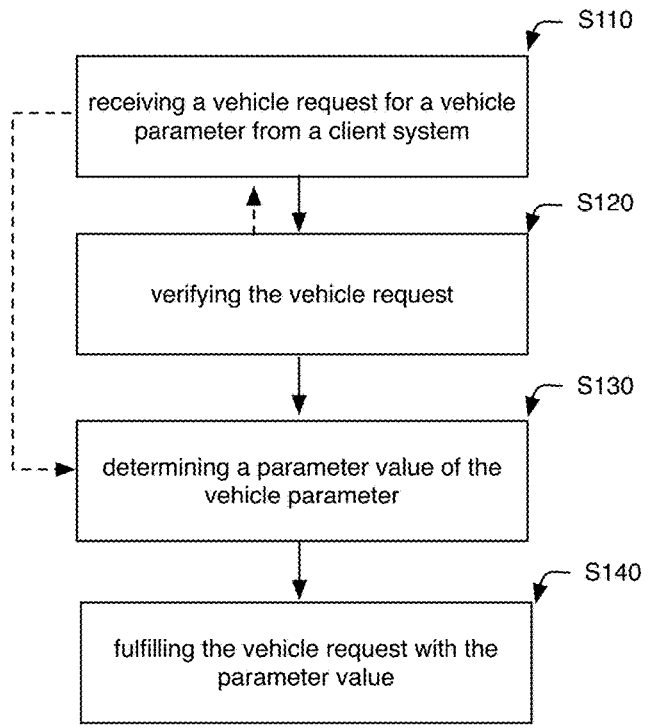
FIG. 1 is a schematic representation of a variation of the method.
Figure 6A:
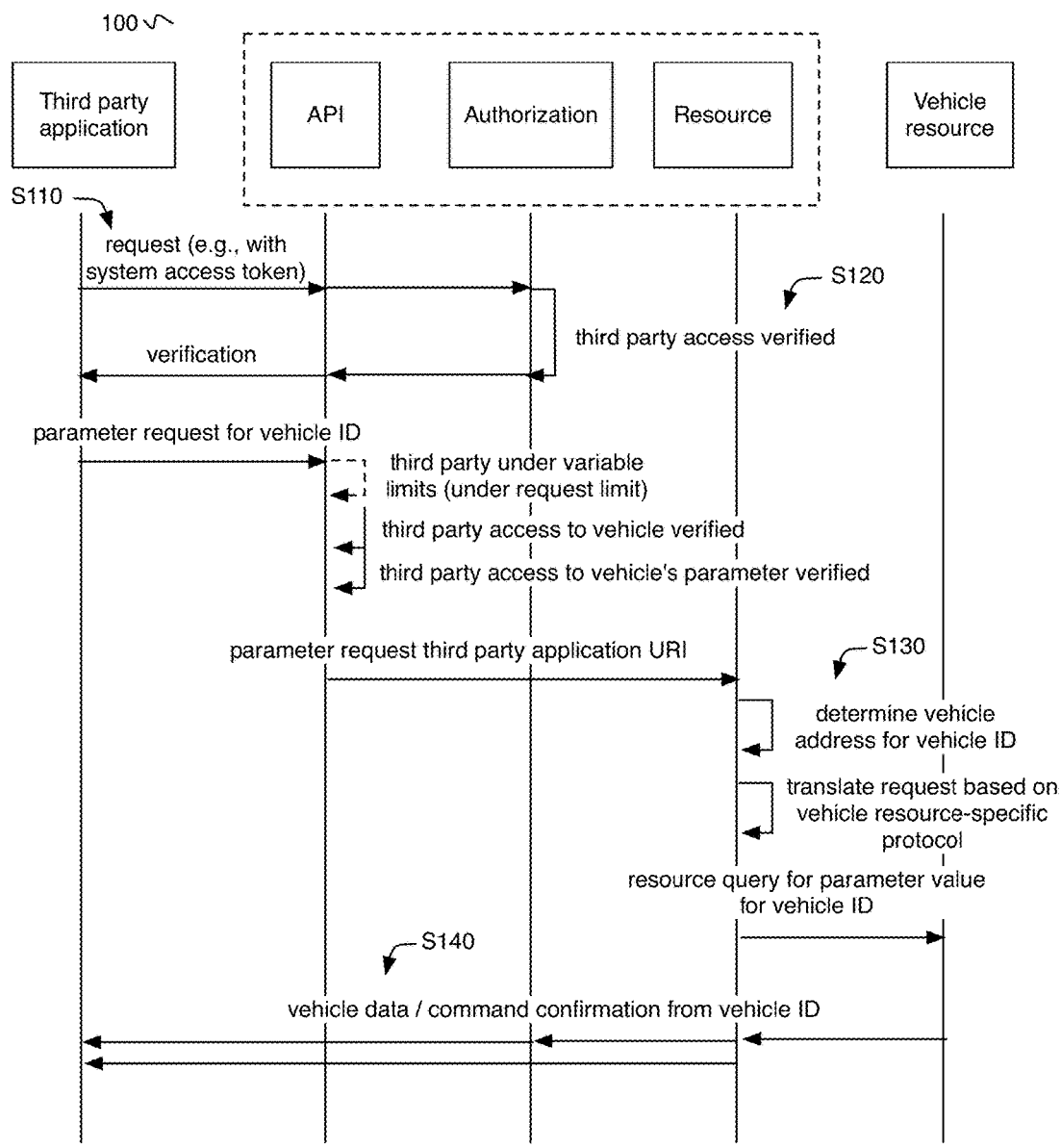
FIG. 6A to 6B are schematic representation of variations of the method.
Figure 6B:
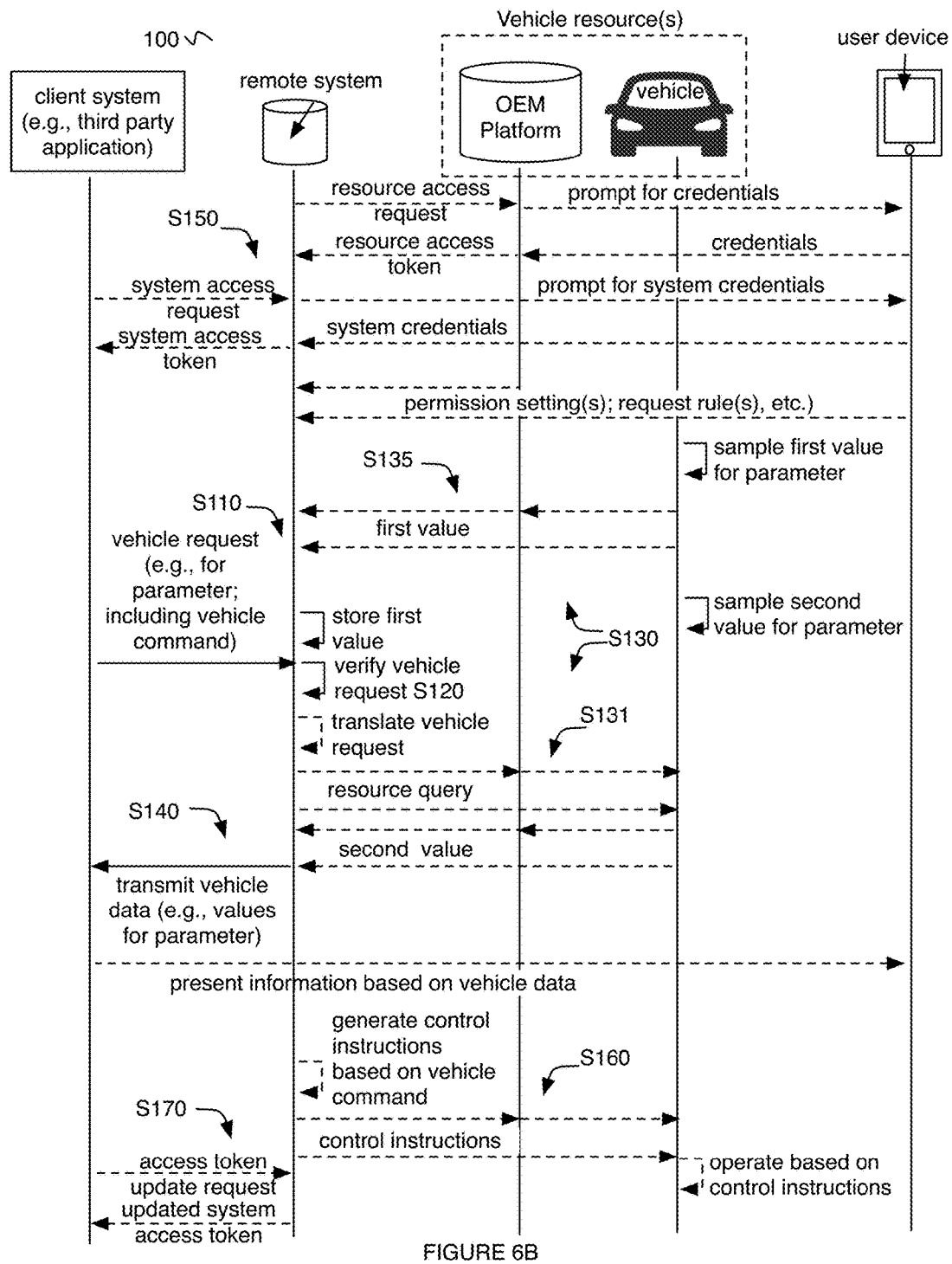

As shown in FIGS. 1 and 6A-6B, an embodiment of a method 100 for processing requests for vehicular data includes: receiving a vehicle request for a vehicle parameter Silo; verifying the vehicle request S120; determining a parameter value for the vehicle parameter S130; and fulfilling the vehicle request with the parameter value S140. The method 100 functions to grant clients (e.g., third party application developers, web developers, etc.) access to vehicle data, and can additionally or alternatively function to grant clients access to vehicle controls.

In a first specific example, the method 100 can additionally or alternatively include: sampling a first value (e.g., parameter value) for a vehicle parameter at a vehicle at a first time; transmitting the first value from the vehicle; storing the first value at a remote system (e.g., caching the first value in association with a vehicle identifier identifying the vehicle); receiving a vehicle request for the vehicle parameter from a third party application; transmitting a resource query for the vehicle parameter to the vehicle resource based on the vehicle identifier; in response to the vehicle resource accepting the resource query, transmitting a second value (e.g., parameter value) for the vehicle parameter from the vehicle resource to the remote system, the second value sampled at the vehicle at a second time after the first time; in response to the vehicle resource rejecting the resource query, retrieving the first value at the remote system; and fulfilling the first vehicle request with at least one of the first value and the second value (e.g., transmitting at least one of the first value and the second value to the third party application).

In a second specific example, the method 100 can additionally or alternatively include: receiving a system access request including an access token (e.g., an API key) and a vehicle identifier (e.g., provided by an OEM platform) from a third party application (e.g., associated with a client identifier such as a client URI identifying a third party application); verifying the access token with the third party application for the vehicle identifier; if the third party application access is verified, granting the third party application access to the vehicle and/or data of the vehicle identified by the vehicle identifier until a variable limit rule is met (e.g., a request limit, a time limit, etc.); receiving a vehicle request including a vehicle parameter (e.g., an API call for a vehicle state, GPS coordinate, vehicle speed, etc.) and/or a vehicle command (e.g., an API call, such as an "engine on" command) from a third party application; in response to receiving a vehicle parameter: determining the value of the parameter for the vehicle (e.g., by transmitting a resource query for the parameter value to the vehicle or retrieving the parameter value from storage), and sending the parameter value to the third party application; in response to receiving a vehicle command: sending the vehicle command and/or control instructions based on the vehicle command to the vehicle (e.g., directly or indirectly, such as through an appropriate adapter module), which can include translating the command into a vehicle-specific command (e.g., by routing the command to an appropriate adapter module for the vehicle endpoint), receiving a command receipt or execution confirmation from the vehicle (e.g., directly or indirectly), and sending a command execution confirmation to the third party application. The OEM platform (e.g., a platform associated with the vehicle and managing vehicle data from the vehicle) can link one or more of the OEM platform's subdomain's DNS' to the system, where the system functions as the backend processing system for one or more OEM platforms (e.g., by implementing different adapter modules tailored to different vehicle resources such as different OEM platforms and/or vehicles, etc.). The customer/user interface can be skinned as an OEM platform interface, client interface, and/or with any other suitable interface.

In a third specific example, an insurance company can automatically subscribe to accessing one or more vehicle parameters (e.g., airbag data, odometer readings, etc.) for the insured vehicles, and automatically generate a claim in response to the one or more vehicle parameters satisfying one or more conditions (e.g., matching a predetermined value, airbag deployment, etc.).

In a fourth specific example, a taxing entity system (e.g., a system associated with a government entity; a third party application associated with a taxing entity; etc.) can automatically retrieve vehicle data (e.g., odometer readings, fuel level, location data, etc.); and calculate a tax (e.g., road usage tax) for the user (e.g., vehicle owner) based on the vehicle data. In a specific example, fuel levels at different times (e.g., at predetermined time intervals; fuel levels retrieved in response to vehicle requests by the taxing entity system, etc.) can be transmitted to a taxing entity system to calculate fuel consumption. In another specific example, location data (e.g., values for location parameters) at different times can be transmitted to the taxing entity system to determine the roads traveled upon (e.g., in-state public roads vs. out-of-state roads) and/or locations of refueling for determining a public road usage tax based on the location data. Location data can be obfuscated (e.g., location data indicating that the vehicle has driven in a particular state and/or on particular roads, but not indicating the specific routes). Vehicle data (e.g., mileage data from odometer readings) transmitted to the taxing entity system and/or any suitable entity can include any one or more of: change between last reported vehicle data and current vehicle data (e.g., most up-to-date vehicle data available), instantaneous, normalized, average, median, and/or any other suitable type of vehicle data. As such, a taxing entity can have a means for taxing vehicles (e.g., electric vehicles, which are not as suitable for taxation through traditional taxes on gas payments) based on remotely retrieved vehicle data (e.g., indicating the extent of use of public roads and traffic-related services).

In a fifth specific example, a crowd sourced valet service (e.g., Luxe™) can automatically determine the geographic locations of the valet service vehicles by querying the vehicles themselves, instead of requesting the information from the devices of the vehicle drivers.

However, the method 100 can be performed and/or used in any other suitable manner.

2. Benefits

The onset of network-connected vehicles has given rise to technological issues (e.g., connectivity issues, privacy issues, vehicle data and/or vehicle control access issues, etc.) that would not exist but for the increasing prevalence of network-connected vehicles generating a plethora of valuable vehicle data. Examples of the method 100 and system confer technologically-rooted solutions to such technological issues.

First, the technology can provide an inventive distribution of functionality across a network. For example, the technology can connect vehicles, OEM platforms, third party applications, and user devices in a network facilitating customization of communication between parties in the network. For example, improvements in computer-related technology can be conferred from, for example, customizable privacy settings for vehicle data associated with different user accounts, customizable permission settings for different third party applications to access vehicle data and/or vehicle controls, customizable request rules for fulfilling data retrieval preferences of third party applications and sharing preferences of users and OEM platforms, and/or other modifiable features.

Second, the technology can confer improvements in the functioning of third party applications in retrieving vehicle data, and the functioning of vehicle resources (e.g., vehicles, OEM platforms, etc.) in delivering vehicle data. The technology can provide a single standardized platform for conveniently granting access to a plurality of vehicle resources. For example, the method 100 can implement rules enabling the automation of operations rooted in computer technology to translate vehicle data requests from third party applications into resource queries tailored to the different data formats and different communications protocols (e.g., HTTP, Websocket, AMQP, Message Queue, MQTT, etc.) of different network-connected vehicles and/or different OEM platforms from a plurality of OEMs.

Third, the technology can improve the security of protected resources (e.g., vehicle data) generated, stored, and transmitted across components of the network, thereby improving the functioning of the network and the computing systems (e.g., vehicles, OEM platforms, third party applications, etc.) operating in the network. The technology can leverage the generation, verification, storage, and usage of access tokens (e.g., system access tokens for accessing the system, resource access tokens for accessing a vehicle resource) to act as a gatekeeper by verifying that third party applications have legitimate access to the requested vehicle parameters, before retrieving and providing values for the vehicle parameters.

Fourth, the technology can improve the functioning of the system (e.g., API subsystem, management subsystem, authorization subsystem, etc.) in accommodating different states of vehicles resources (e.g., an offline state when the vehicle is turned off) when fulfilling vehicle requests. For example, the technology can periodically retrieve and cache vehicle data (e.g., when the vehicle resource is online) to provide to requesting third party applications in situations when the vehicle resource is unreachable (e.g., when a vehicle is in a network connectivity dead zone).

Fifth, the technology can improve the processing efficiency of systems in the network through optimizing vehicle request scheduling and vehicle data retrieval. For example, the method 100 can limit and/or dynamically schedule the number of calls to a vehicle resource in order to control bandwidth usage amongst network participants. In another example, the method 100 can batch, prioritize, and/or otherwise schedule vehicle requests based on vehicle resource preferences (e.g., spreading out resource queries to an OEM platform with strict variable limit data retrieval rules), emergency levels (e.g., prioritizing vehicle data requests related to vehicular accident situations), and/or other suitable criteria.

Sixth, the technology can improve the functioning of network by facilitating the setup of connections between components to the network (e.g., setup processes for associating vehicle identifiers with user identifiers, for associating third party applications with user identifiers, etc.).

Seventh, the technology can transform components (e.g., vehicles, vehicle requests, etc.) into different states or things. For example, the method 100 can include controlling vehicle operation (e.g., vehicle data transmission operation, engine operation, etc.) based on remotely transmitted vehicle commands, thereby improving the technological process of remote vehicle management by a third party application and/or user.

The technology can, however, provide any other suitable benefit(s) in the context of using non-generalized computer systems for processing vehicle data requests.

3. System

Figure 2:
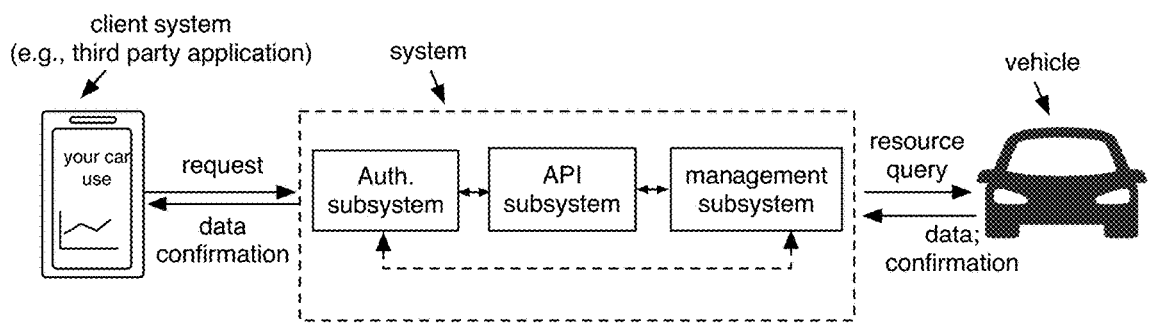
FIG. 2 is a schematic representation of system interaction with a third party application and the vehicle resource.

As shown in FIG. 2, the method 100 is preferably performed with a system including an authorization subsystem, a management subsystem, and an application programming interface (API) subsystem, but can additionally or alternatively be performed with any other suitable system. The system can additionally or alternatively include a vehicle resource (e.g., a vehicle, an OEM platform, a client system associated with a third party application), job queues, rate limiters, and/or any other suitable component. The vehicle can include any one or more of: a processing system, communications system, sensor set (e.g., motion sensors, location sensors, fuel sensors, proximity sensors, optical sensors, oxygen sensors, etc.), and/or any other suitable component. The vehicle is preferably configured to sample values for vehicle parameters at the sensor set at any given time; receive resource queries (e.g., from a remote system, from an OEM platform, etc.); verify resource access tokens (e.g., included in a resource query); transmit sampled values (e.g., to a remote system, to an OEM platform); and/or perform any suitable operation.

Figure 9:
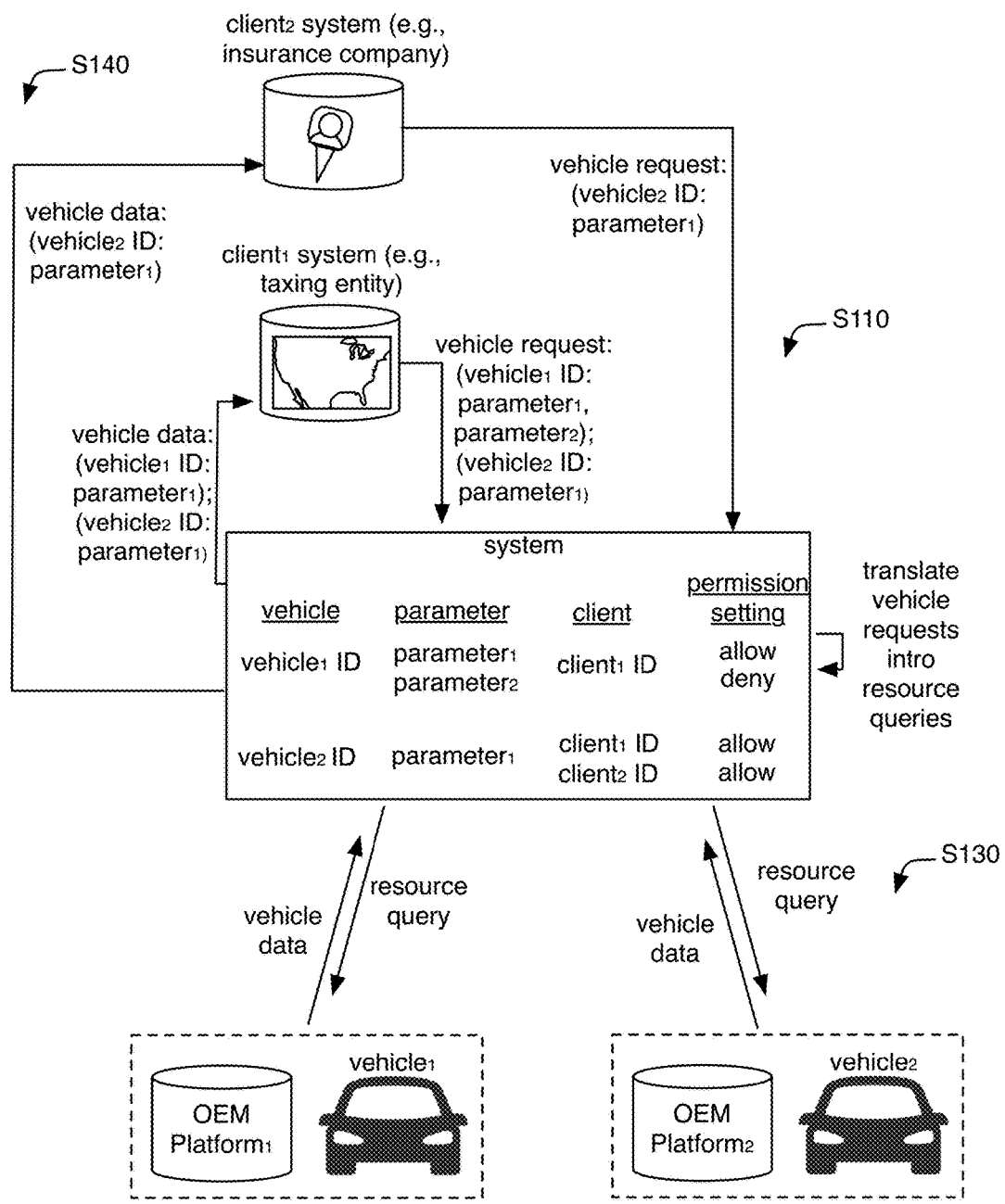
FIG. 9 is a flow representation of a specific example of processing vehicle requests from client systems.

The system functions to enable third party access to vehicle data (e.g., sampled at sensors of the vehicle) and/or vehicle controls. The system preferably interfaces with a third party application through the API subsystem, but can additionally or alternatively interface with any other suitable client system in any other suitable manner. The third party application can be a web application (e.g., running on a web server), a user-agent-based application, a native application, and/or be any other suitable client system. The system can additionally or alternatively interface with a vehicle resource through the API, and/or any other suitable endpoint in any other suitable manner. The vehicle resource can be a resource associated with a vehicle OEM, such as an OEM platform, where the OEM platform is capable of accessing, requesting, controlling, or otherwise interfacing with physical vehicles (e.g., manufactured by the OEM or otherwise connected to the OEM platform). Alternatively, the vehicle resource can be the physical vehicle, where the API can directly request and/or receive information from the vehicle itself. However, the vehicle resource can include any suitable component (e.g., an API subsystem when vehicle data is obtained from storage of the API subsystem). As shown in FIG. 9, the system can interface with and/or include any number of vehicle resources of any type (e.g., where a first vehicle resource is a first vehicle, and where a second vehicle resource is an OEM platform associated with a second vehicle). However, the vehicle resource can include any suitable component associated with any suitable party.

The third party applications can communicate with the system (e.g., the API subsystem) via an HTTP protocol (e.g., using "GET" and "POST" requests), but can additionally or alternatively communicate with the system using PHP, Python, JavaScript, an iOS SDK, Android SDK, and/or through any other suitable application protocol. The API calls are preferably signed with an access token (e.g., system access token) granted to the third party application by the authorization subsystem, but the third party application identity or permission settings can be otherwise determined.

The authorization subsystem functions to store user account information, such as vehicle identifiers that are associated with each user account, vehicle parameter permission settings (e.g., which vehicle parameters are available to third parties, on a per-vehicle basis), user profiles, user preferences, user credentials (e.g., login information to the system, to a third party application, to an OEM platform, etc.), OEM platform identifiers associated with each user account, and/or other user account information. The authorization subsystem can additionally or alternatively generate, store, and/or transmit any one or more of: third party information, such as authentication codes, access tokens, vehicle permission settings, user account permission settings, vehicle parameter permission settings (e.g., which vehicle parameters the third party has requested or has access to), query rate limits, and/or other third party account information. However, the authorization subsystem can be configured in any suitable manner.

Figure 10:
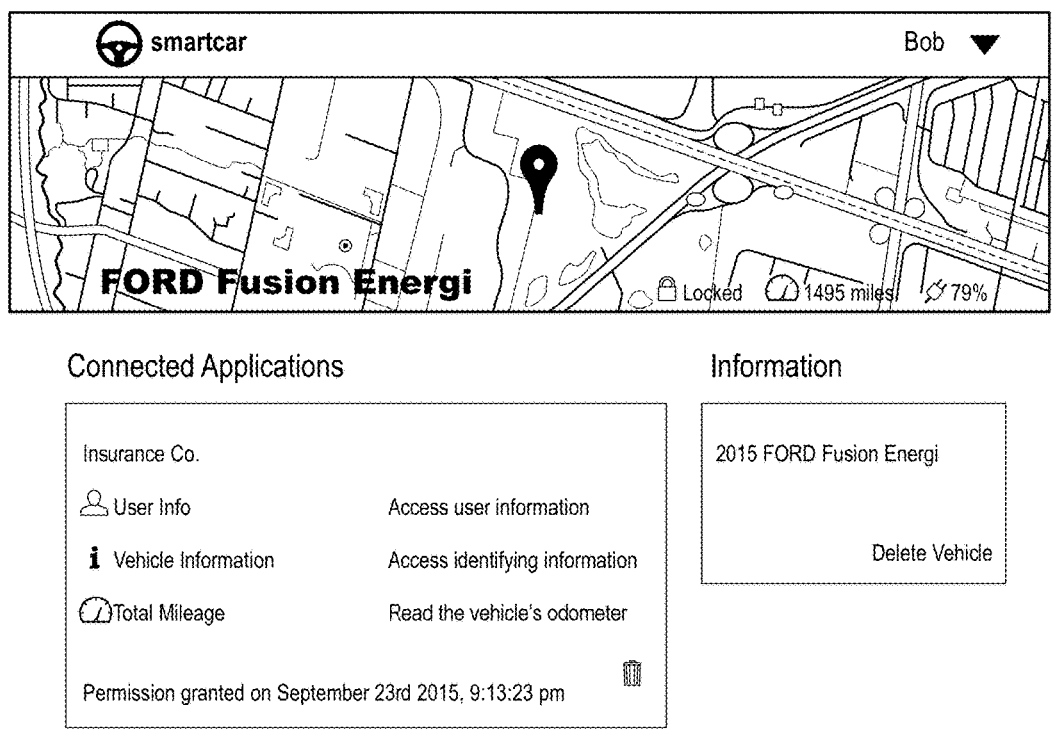
FIG. 10 is a specific example of a user interface enabling the user account to interact with third party applications connected to the user account.
Figure 11A:
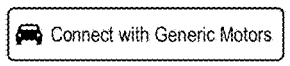
FIGS. 11A to 11D are schematic representations of a specific example of user login.
Figure 11B:
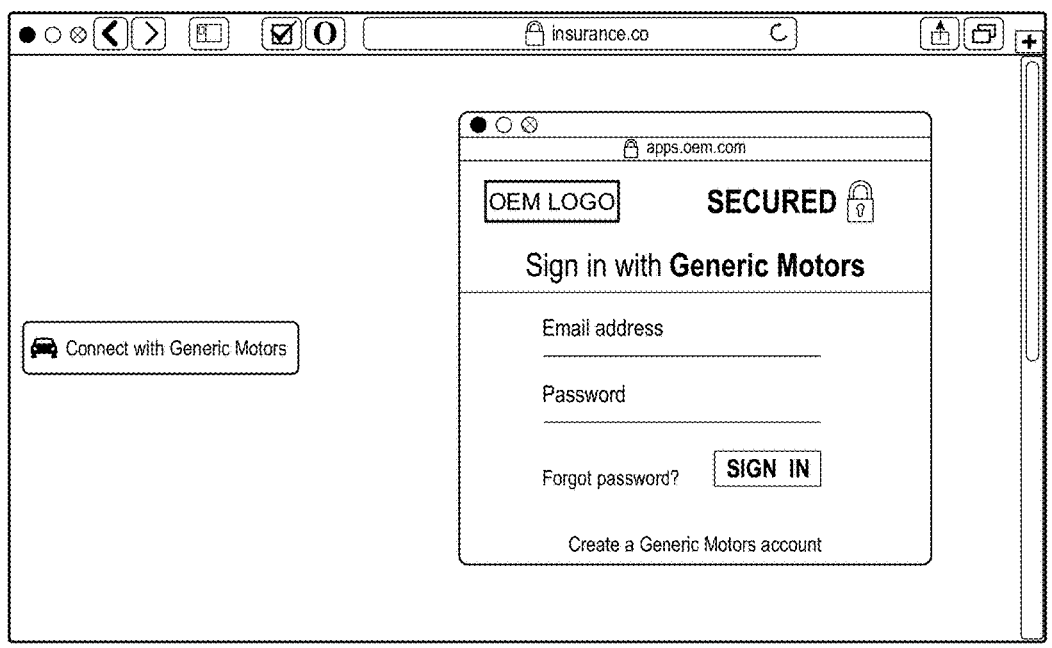
Figure 11C:
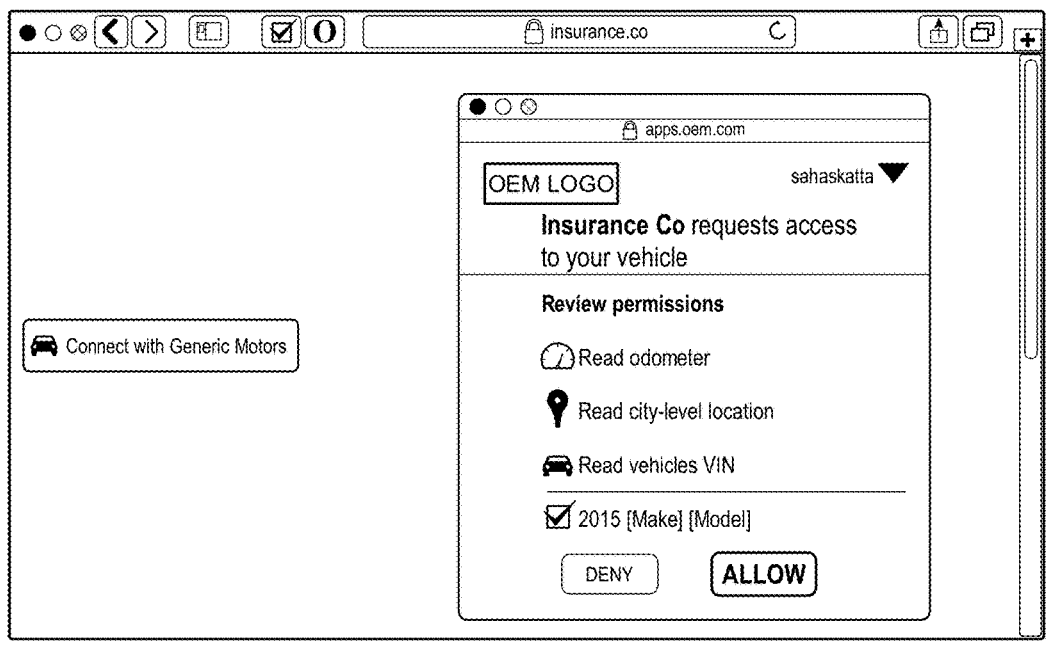
Figure 11D:
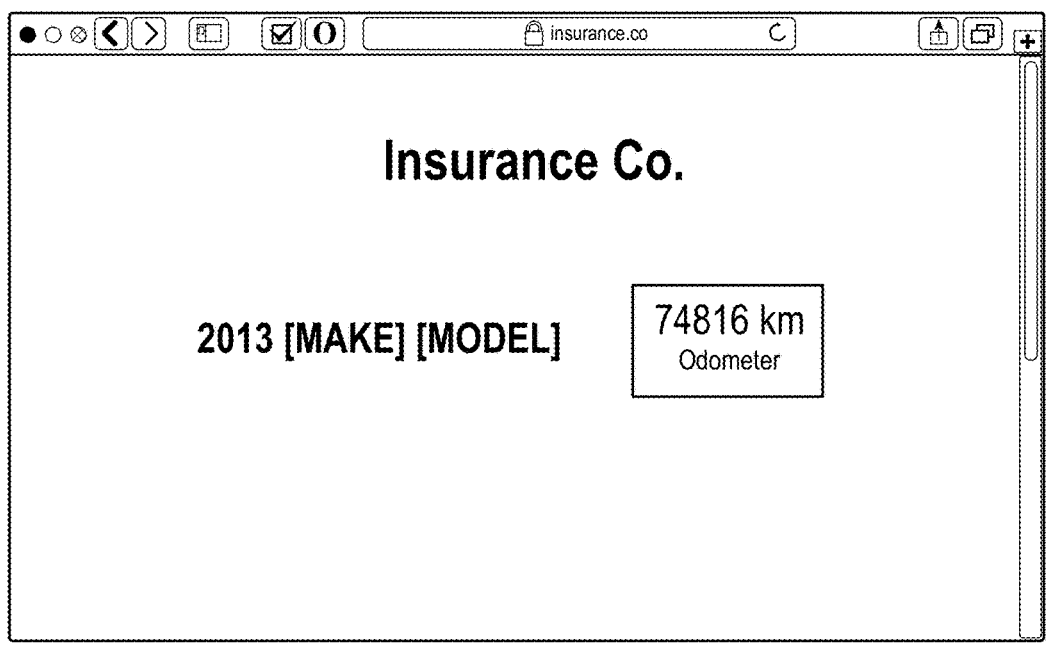

The management subsystem functions to manage the third party applications that have been connected to the user account, enable the user account to interact with permission settings for the third party applications (e.g., add or drop third party applications connected to the user account, retrieve application secrets, etc.), and/or otherwise interact with the third party applications connected to the user account. An example of a user interface enabling such third party application interaction is shown in FIG. 10. However, the management subsystem can store any other suitable information. In operation, the management subsystem can receive data submitted by the third party (e.g., user information, vehicle assignment information, etc.) and/or user (e.g., permission settings, etc.), create authentication codes, verify authentication codes, create and provide access tokens, and/or perform any other suitable functionality. However, the management subsystem can be configured in any suitable manner.

The API subsystem functions as the interface between the third party application, the vehicle resource, the authorization subsystem, and the management subsystem. However, the API subsystem can perform any other suitable functionality. The API subsystem is preferably a REST server (e.g., a stateless server), but can alternatively be a state server or have any other suitable configuration. In operation, the API subsystem can receive requests from the third party, redirect requests to the authorization subsystem, generate operating instructions for itself (e.g., call requests, routing requests, state change requests), generate requests for the vehicle resource (e.g., call requests, routing requests, state change requests), receive vehicle data from the vehicle resource, and/or forward vehicle data to the third party application. However, the API subsystem can function in any other suitable manner. Requests to the API subsystem can be implemented in the form of a set of REST URLs (e.g., where the URLs can include the state), a library, a package, and/or in any other suitable form. In one variation, the API subsystem can include a set of adapter modules, each configured to interface with an individual vehicle OEM platform. The adapter module can translate a set of standardized commands and requests into vehicle resource-specific (e.g., OEM platform-specific, vehicle-specific, etc.) commands and requests. In one example of system use, a request from a third party application is routed through the API subsystem and routed to the appropriate adapter module for the vehicle endpoint, where the respective adapter module communicates the request (and/or receives information) from the vehicle resource.

The API subsystem can additionally function to provide protected resources to the third party. The protected resources are preferably vehicle data but can additionally or alternatively include any other suitable data. The API subsystem preferably stores the vehicle data (e.g., in raw or processed form), and can additionally or alternatively generate, store, and/or transmit: third party access permission settings for vehicle data (e.g., in general, for a specific user account, for a specific vehicle identifier, etc.), authentication codes, access tokens (e.g., system access tokens for a third party application to interface with the API subsystem, OEM access tokens for the system to interface with OEM platforms, vehicle access tokens for the system to interface with vehicles, etc.), static vehicle information (e.g., VIN, color, make, model, etc.), request rules (e.g., variable limit rules such as query rate limits for a vehicle identifier, query rate limits for a client system, etc.), protocol rules (e.g., for translating vehicle requests into resource queries), and/or store any other suitable set of information. Additionally or alternatively, the API subsystem can request information from the vehicle resource, receive information from the vehicle resource, cache vehicle data (e.g., for a predetermined period of time, for a predetermined number of call requests, etc.), and/or otherwise manage vehicle data. In one variation of API subsystem operation, the API subsystem receives a request from the third party application including a resource request and an access token (e.g., a system access token), and, in response to verification of the access token (e.g., received from the authorization subsystem), sends the requested resource to the third party application. In one variation, the authorization subsystem associates the access token with a redirection URI pointing to the third party application during access token generation. In this variation, the access token is verified by matching the access token with the URI from which the access token was received, where the access token is verified if the redirection URI associated with the access token is, or is associated with, the sending URI. Additionally or alternatively, the access token can be otherwise verified. However, the API subsystem can provide protected resources (e.g., vehicle data) to the third party application in any other suitable manner, and/or be otherwise configured.

The system (e.g., a management subsystem, an API subsystem, an authentication subsystem) can additionally or alternatively store any one or more of the following in any suitable association relationship: identifiers (e.g., vehicle resource identifiers such as OEM identifiers and/or vehicle identifiers, client identifiers such as for a third party application, user identifiers such as user account information, etc.), access tokens (e.g., system access tokens for accessing the system, resource access tokens for accessing vehicle resources, etc.), permission settings (e.g., permitting and/or denying access to vehicle parameters, vehicle controls, etc.), rules (e.g., request rules for verifying a request, for request scheduling, etc.), protocols (e.g., vehicle resource-specific protocols, etc.), models (e.g., for dynamically generating and/or transmitting resource queries), and/or any other suitable component. For example, the system can store a set of vehicle identifiers and/or user identifiers in association with a client identifier identifying a third party application, where the third party application has access (e.g., vehicle parameter access, vehicle control access, etc.) to vehicles identified by the vehicle identifiers associated with the client identifier. Additionally or alternatively, an identifier (e.g., user identifier, client identifier, vehicle identifier) can be associated with a set of parameter permission settings, where the third party applications associated with the identifier can only access vehicle parameters identified by the parameter permission settings. For example, a third party application whose client identifier is only associated with odometer data can only access odometer data from any vehicle, and cannot access any other vehicle parameters. In another example, a vehicle identifier can be stored in association with a first and a second permission setting for a first and a second third party application, respectively, where the first permission setting grants access to a vehicle resource, and the second permission setting is distinct from the first permission settings (e.g., denying access to the vehicle resource). In another example, an identifier (e.g., a user identifier) can be stored in association with a first and a second OEM access token granting access to a first and a second OEM platform, respectively. The first OEM access token can be associated with a first permission level granting access to a first vehicle parameter at the first OEM platform, and the second OEM access token can be associated with a second permission level granting access to a second vehicle parameter at the second OEM platform. Permission settings can be granted by and/or included in access tokens (e.g., generated in response to verifying a system access request by a third party application for accessing vehicle data), such that received and/or transmitted access tokens (e.g., included in a vehicle request and/or resource query) specify the permissions associated with the request and/or query. For example, a user identifier and/or vehicle identifier can be stored in association with one or more vehicle-resource access tokens (e.g., OEM access tokens for accessing OEM platforms) associated with similar and/or varying permission settings for accessing vehicle data and/or controls. Permission settings can include vehicle parameter access, temporal access (e.g., third parties can only access the vehicle parameter data during a set time period), and/or include any other suitable set of access permissions. For example, a third party application can access all information for a first vehicle associated with an "open access" set of permission settings that permit any vehicle parameter to be accessed, while the same third party can only access the battery level readout (e.g., state-of-charge level) for a second vehicle associated with permission settings that only permit battery level data to be accessed. Additionally or alternatively, the client identifier can be associated with a set of population permissions, where the respective third party application has access to population-level data (e.g., the number of cars currently driving, the distribution of cars over a geographic region, the battery state of a population of cars, etc.) without access to the specific vehicle data abstracted into the population-level data. However, system information can be otherwise stored, associated, and/or managed.

The system and/or portions of the system (e.g., authorization subsystem, management subsystem, API subsystem, etc.) can entirely or partially be executed by, hosted on, communicate with, and/or otherwise include one or more of: a remote system (e.g., a remote server, at least one networked computing system such as servers, dynamically expandable and/or contractable networked servers for accommodating volume changes of vehicle requests and/or resource queries, stateless, stateful, etc.), a local computing system, an OEM platform (e.g., for receiving, storing, and transmitting vehicle data), a vehicle, a client system, a user device, databases (e.g., client databases of a client system, vehicle resources, etc.), and/or by any suitable component. Communication by and/or between any components of the system can include wireless communication (e.g., WiFi, Bluetooth, radiofrequency, etc.) and/or wired communication. However, the system can be configured in any suitable manner.

4. Method

As shown in FIGS. 1 and 6A-6B, an embodiment of a method 100 for processing requests for vehicular data includes: receiving a vehicle request for a vehicle parameter S110; verifying the vehicle request S120; determining a parameter value for the vehicle parameter S130; and fulfilling the vehicle request with the parameter value S140. The method 100 can additionally or alternatively include: connecting the system to a vehicle resource S150; controlling the vehicle based on a vehicle command S160; and/or updating system information S170.

Receiving a vehicle request for a vehicle parameter Silo functions to receive a request from a client system (e.g., third party application) to access vehicle resources and/or receive parameter values from vehicle resources. The vehicle request is preferably received by the API subsystem but can be received by any suitable component. The vehicle request preferably includes one or more vehicle parameters and/or vehicle commands (e.g., vehicle actions, compression instructions, processing instructions to process raw data on the vehicle, encryption instructions, etc.), but can additionally or alternatively include an access token (e.g., a system access token used to verify the client's access), a redirection URI (e.g., to identify the location where the vehicle data should be sent), and/or include any other suitable information. The vehicle parameter can include: requested vehicle data (e.g., vehicle outputs) and/or include any other suitable data. The vehicle parameter can additionally or alternatively include an endpoint identifier that can function to identify the vehicle(s) from which the vehicle data is to be requested and/or the vehicle(s) to be controlled by the vehicle command. The endpoint identifier can be a vehicle identifier, user identifier (e.g., where the target vehicles are vehicles associated with the user identifier), vehicle population identifier (e.g., an identifying parameter of a vehicle population, such as make, model, location, vehicle parameter value, OEM, etc.), and/or include any other suitable identifying characteristic. Alternatively, the vehicle request can omit an endpoint identifier. For example, the method 100 can include receiving a vehicle request from a third party application for odometer readings; identifying user identifiers associated with the client identifier identifying the third party application; and for each of the vehicle identifiers associated with the user identifiers, retrieving odometer readings values associated with the vehicle identifier. As shown in FIG. 9, vehicle requests can be for any number of vehicle parameters including any number endpoint identifiers. For example, the method 100 can include receiving a vehicle request for location parameters for vehicles manufactured by a first OEM and a second OEM (e.g., specified by a first and a second vehicle population identifier); identifying user identifiers associated with a first and a second OEM identifier identifying the first and second OEMs, respectively; for each user identifier: retrieving the vehicle location parameters associated with vehicle identifiers identifying vehicles manufactured by the first and second OEM.

Vehicle data preferably includes vehicle outputs, such as sensor measurements and/or the component operation states (e.g., instantaneous, past, or future), but can additionally or alternatively include any other suitable vehicle data. The vehicle data can be timestamped (e.g., with the time of data generation, with the time of data transmission, etc.) or time agnostic. Examples of vehicle parameters (e.g., for which vehicle data can be obtained) can include any one or more of: vehicle operation parameters (e.g., vehicle operation mode, engine operation parameters, etc.), vehicle odometer reading, vehicle battery level (e.g., state-of-charge, etc.), vehicle location parameters (e.g., GPS coordinates or compass heading, etc.), proximity sensor parameters (e.g., radar, electromagnetic sensor, ultrasonic sensor, light detection and ranging, light amplification for detection and ranging, line laser scanner, laser detection and ranging, airborne laser swath mapping, laser altimetry, sonar, etc.), vehicle camera parameters (e.g., in-car cameras, exterior cameras, back-up cameras, dashboard cameras, front-view cameras, side-view cameras, image recognition, infrared camera, 3D stereo camera, monocular camera, etc.), motion parameters (e.g., car speed, RPM, acceleration, accelerometer parameters, gyroscope parameters, etc.), altimeter, environmental parameters (e.g., pressure, temperature, etc.), light sensor parameters (e.g., from infrared sensors, ambient light sensors, etc.), fuel level (e.g., percentile-based, distance-based, low warning, etc.), fuel system status, oxygen sensor parameters, throttle position, gear parameters (e.g., drive, neutral, park, reverse, gear number, etc.), HVAC parameters (e.g., current temperature, target temperature, etc.), driving status (e.g., restricted features such as user inputs into control panel, unrestricted features, etc.), vehicle internal or external temperature, vehicle tire pressure, vehicle range, vehicle component operation state (e.g., whether a specific door is open or closed, whether a lock is engaged or disengaged, etc.), smart-seat outputs, related parameters from non-vehicle devices (e.g., driver smartphone parameters, driver medical device parameters, etc.), and/or any other suitable parameters.

Vehicle commands (e.g., vehicle actions) preferably include vehicle inputs, such as component operation instructions and/or target operation states for vehicle components, but can additionally or alternatively include any other suitable vehicle command. The vehicle commands can be timestamped (e.g., with a target performance time or the time of vehicle command generation, such that the vehicle can queue and execute a series of commands in a time-ordered manner) and/or time agnostic. Examples of vehicle commands include: locking or unlocking the doors, opening or closing the trunk, raising or lowering the convertible roof, starting the engine, shutting the engine off, climate controls, routing the vehicle, defrost controls, window controls, sunroof controls, headlight control, charge port control, charging schedule control, charging limit control, accessory controls (e.g., controlling the seat warmers or seat massager), interior lighting control, alarm control, and/or include any other suitable vehicle action. However, receiving a vehicle request can be performed in any suitable manner.

Verifying a vehicle request S120 functions to verify client access (e.g., third party application access) to vehicle parameters and/or vehicle controls. Verifying a vehicle request can additionally or alternatively include verifying that the client has access to the vehicle parameters for a specific set of vehicles (e.g., a subset of vehicle identifiers). Verifying client access can additionally include verifying that the client is eligible to make requests (e.g., that the client has not exceeded a variable limit rule, such as a request limit, example shown in FIG. 6A), and prompting the client to obtain eligibility (e.g., through purchasing more request credits, etc.) if the client is deemed ineligible. Verifying a vehicle request can be performed by a remote system (e.g., authorization subsystem, API subsystem) and/or any other suitable system component. Verifying a vehicle request is preferably in response to receipt of the vehicle request, but can additionally or alternatively be verified at any suitable time (e.g., in response to receiving a set of vehicle requests and/or based on a request scheduling rule, etc.). Verifying a vehicle request preferably includes mapping the vehicle request to a stored user identifier (e.g., in association with a vehicle identifier, access tokens, vehicle data, etc., which can be retrieved based on the user identifier), such as based on an endpoint identifier included in the vehicle request. Additionally or alternatively, the vehicle request can be mapped to and/or associated with any suitable identifier and/or other system information.

In a first variation, verifying a vehicle request can include using an authorization service, such as OAuth. In this variation, client access can be verified by matching an access token (e.g., a system access token received in a vehicle request) with a client identifier (e.g., a redirection URI; a URI associated with the address from which the access token was received; the address itself; a client identifier identifying the third party application from which the vehicle request was received; etc.). The access token can be received as part of the vehicle request, received in a separate request (e.g., a preceding, concurrent, or other request), and/or be received in any suitable manner. In this variation, client access can be granted for a predetermined time period, a predetermined number of requests (e.g., granted up to a request limit), a login session, and/or for any suitable duration. Client access can be terminated in response to expiration of the time period, the number of client requests meeting or exceeding the request limit, session termination, and/or in response to the occurrence of any other suitable end event. However, authorization can be performed in any suitable manner.

In a second variation, verifying a vehicle request can include accessing permission settings stored by the system (e.g., at a management subsystem). For example, verifying can include receiving a vehicle request, mapping the vehicle request to an identifier (e.g., a client identifier, a vehicle identifier, a user identifier, etc.), and verifying based on permission settings associated with the identifier (e.g., where the permission settings specify whether the requesting party is permitted to access the vehicle parameters and/or vehicle controls). However, verifying vehicle requests based on permission settings can be performed in any suitable manner.

In a third variation, verifying the vehicle request can include evaluating the vehicle request against request rules established by a user (e.g., at an application executing on a user device), a vehicle resource, the system, and/or any other suitable entity. Request rules can include any one or more of: variable limit rules (e.g., limiting data access to a particular time range, amount of data, types of data, etc.), connectivity rules (e.g., enabling data transmission in response to a vehicle request based on vehicle connectivity to the network, such as type of wireless connection, etc.), endpoint rules (e.g., varying access based on endpoint identifier such as vehicle identifier and/or OEM identifier), request scheduling rules (e.g., accepting or denying vehicle requests based on receipt timestamp; based on timestamp in relation to timestamps of historical vehicle requests such as for the same vehicle parameter; prioritization of fulfilling requests from different clients; denying client access based on low priority status; etc.), account credit rules (e.g., access granted when the account balance exceeds a threshold balance), and/or any other suitable type of rule. For example, the method 100 can include associating a user identifier with a variable limit rule from a plurality of request rules stored (e.g., at a remote system) in association with a plurality of user identifiers; associating a vehicle request with the variable limit rule; transmitting a rejection of the vehicle request (e.g., to the requesting party such as a third party application) in response to determining that the vehicle request fails to satisfy the variable limit rule; and transmitting a resource query to a vehicle resource for the requested vehicle parameter in response to determining that the vehicle request satisfies the variable limit rule. In another example, the method 100 can include determining a timestamp of a historical resource query transmitted for the vehicle parameter to the vehicle resource; and determining a request receipt timestamp of the vehicle request, where verifying the vehicle request is based on a request scheduling rule for the timestamp and the historical timestamp (e.g., the timestamp being within a threshold duration of the request receipt timestamp). Request rules can be customized for and/or associated with different identifiers (e.g., different user identifiers, vehicle identifiers, vehicle population identifiers, etc.), tokens, and/or any suitable system information. For example, request rules can be customized across different OEM platforms (e.g., a first OEM platform associated with a first request rule allowing vehicle data retrieval once a day for a first subset of vehicle parameters; a second OEM associated with a second request rule allowing any amount of vehicle data to be retrieved for any vehicle parameter). However, verifying vehicle requests based on request rules can be performed in any suitable manner.

In a fourth variation, verifying can include verifying a vehicle request for multiple vehicle parameters (e.g., a multi-parameter request). A multi-parameter request can include a plurality of vehicle parameters associated with any number of: vehicles, OEM platforms, user accounts, and/or other suitable components. Verifying client access can be repeated for each vehicle parameter requested and/or repeated any suitable number of times. The method 100 can include partially and/or fully a multi-parameter request in response to partially and/or fully verifying the vehicle request. Additionally or alternatively, verifying a vehicle request for multiple parameters can be otherwise performed. However, verifying the vehicle request can be performed in any suitable manner.

Determining a parameter value for the vehicle parameter S130 functions to generate, retrieve, receive, and/or otherwise determine the parameter values requested by the requesting party (e.g., third party application) for the vehicle parameter. As shown in FIG. 6B, determining parameter values can additionally or alternatively include retrieving vehicle data from the vehicle resource S131 (e.g., in a pull paradigm); receiving vehicle data from the vehicle resource S135 (e.g., in a push paradigm), and/or any other suitable process.

The parameter values can be determined in response to receipt of the vehicle request, in response to verification of the vehicle request, at a predetermined frequency (e.g., independent of responding to a vehicle request), and/or at any other suitable time. The parameter values are preferably determined by the API subsystem, but can additionally or alternatively be determined by any other suitable component. The method 100 can additionally include automatically processing raw information received from the vehicle resources into higher-level parameter data (e.g., summary data, combined data, averaged data, etc.). The raw information and/or auxiliary information can be processed according to instructions received from the client system (e.g., in a vehicle request by the third party application), based on request rules (e.g., associated with the endpoint identifier identified in the vehicle request), based on instructions associated with a requested vehicle parameter, and/or otherwise processed. However, raw information, auxiliary information (e.g., from auxiliary sources, such as weather sources, social media sources, etc.), and/or any other values regarding requested vehicle parameters can be determined and/or returned to the requesting party.

Figure 3:
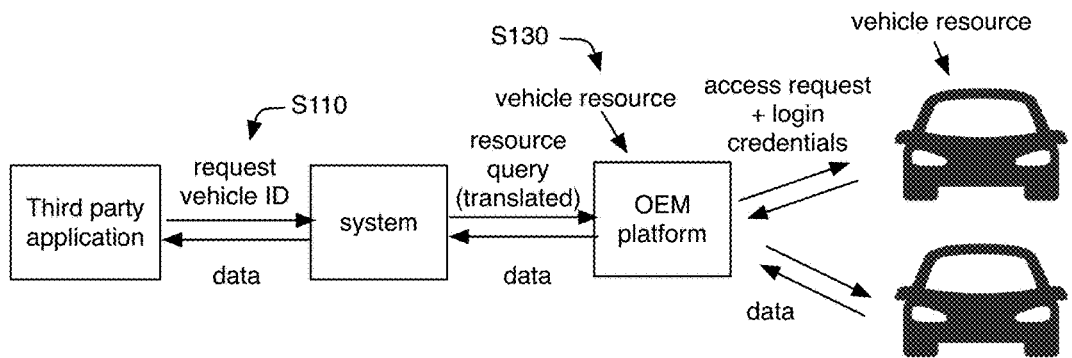
FIG. 3 is a schematic representation of a first variation of system interaction with the third party application and the vehicle resource, including intermediary communication facilitation by the original equipment manufacturer (OEM) platform.
Figure 4:
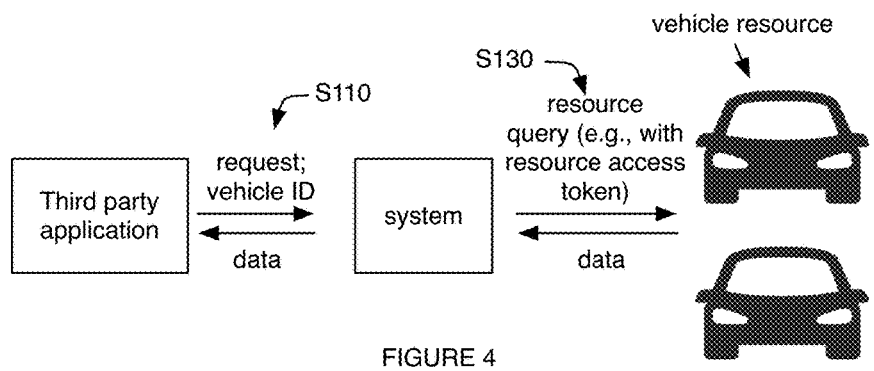
FIG. 4 is a schematic representation of a second variation of system interaction with the third party application and the vehicle resource, including direct communication with the vehicle.
Figure 5:
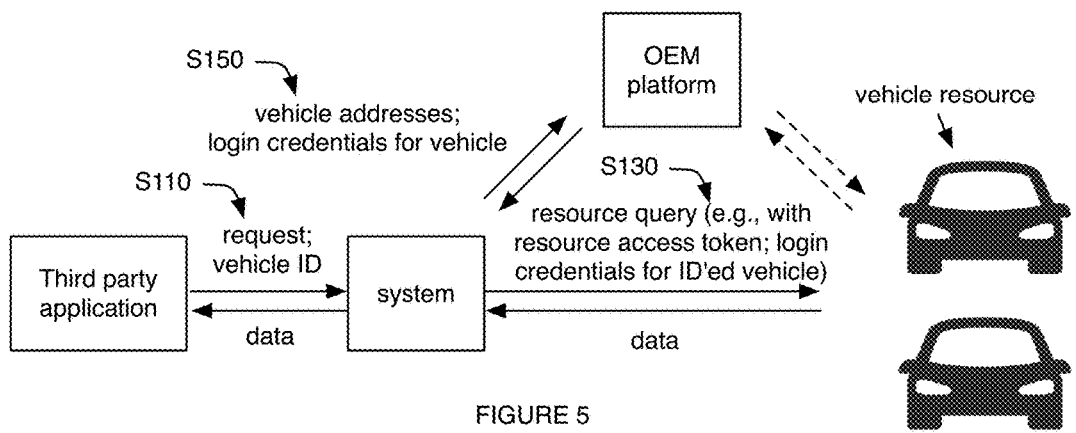
FIG. 5 is a schematic representation of a third variation of system interaction with the third party application and the vehicle resource, including direct communication with the vehicle and information receipt from the OEM platform.

Retrieving vehicle data from the vehicle resource (e.g., vehicle, OEM platform, etc.) S131 functions to obtain vehicle data (e.g., in a pull paradigm) associated with the requested vehicle parameters. Retrieved vehicle data is preferably vehicle data permitted to be accessed by the requesting party (e.g., based on access tokens, permission settings, etc.), but can additionally or alternatively include other vehicle data and/or other suitable data. Retrieving vehicle data can include generating a resource query for the parameter value; and/or transmitting the resource query to the vehicle resource (e.g., associated with a vehicle identifier identified based on the vehicle request), where one or more parameter values can be received from the vehicle resource in response to the vehicle resource fulfilling the resource query. The resource query can additionally or alternatively include vehicle resource access information (e.g., vehicle address; credentials, where the vehicle identifier can be associated with credentials to log into the vehicle and/or OEM platform) that can be stored and/or retrieved by the API subsystem, authorization subsystem, management subsystem, and/or other suitable system; access tokens (e.g., a resource access token generated by the vehicle resource and transmitted to the system from the vehicle resource), and/or any other suitable data. For example, the resource query can include a resource access token stored in association with the user identifier, the resource access token granting access to the first vehicle resource. In another example, resource access tokens included in a resource query can be received from the requesting party (e.g., in the vehicle request, along with the system access token). In this example, the vehicle resource can grant the system permission to distribute resource access tokens (e.g., received at the system from the vehicle resource; generated by the system; etc.), such as to third party applications. Additionally or alternatively, a client system can access the vehicle resource directly with an OEM access token. However, resource queries can be otherwise configured. Transmitting the resource query preferably includes identifying a vehicle address (e.g., a vehicle URI, an OEM platform URI) and sending the resource query to the vehicle address, but the resource query can be otherwise transmitted. When the vehicle resource is the vehicle itself (example shown in FIGS. 4 and 5), the requested information is preferably automatically returned to the system (e.g., to the API subsystem). When the vehicle resource is an intermediary resource (e.g., an OEM platform, example shown in FIG. 3), the request is preferably forwarded to the vehicle by the intermediary resource, where the requested information is returned to the intermediary resource and subsequently sent directly or indirectly via the intermediary resource, to the API subsystem.

In relation to retrieving vehicle data, generating a resource query can include translating one or more vehicle requests into the resource query (e.g., through an adapter module) based on one or more protocols (e.g., vehicle resource-specific protocols). The protocols (e.g., associated with protocol rules) can include communication protocols (e.g., specific to vehicle resource), security protocols, regulatory protocols (e.g., specific to country), and/or any other suitable protocols. Communication protocols and/or other protocols can include any one or more of: HTTP, Websocket, AMQP, Message Queue, MQTT, and/or any other suitable protocols. Different protocols can be associated with different identifiers (e.g., different user identifiers, vehicle identifiers, etc.), such that generating a resource query for a first vehicle can be based on different protocols than generating a resource query for a second vehicle. In an example, translation can include batching vehicle requests (e.g., aggregating the requested vehicle parameter based on a shared endpoint identifier); and translating the batched vehicle requests (e.g., into a single resource query). In another example, a given vehicle request (e.g., for vehicle parameters for each vehicle associated with a user identifier) can be translated into multiple queries (e.g., for different OEM platforms associated with the different vehicles) based on different vehicle resource-specific protocols (e.g., different OEM platform protocols). In a specific example, translation can include translating a vehicle request into a first resource query based on a first subset of communication protocol rules associated with a first vehicle resource (e.g., a first OEM platform; a first vehicle operating on a first OEM platform; etc.); and translating the vehicle request into a second resource query based on a second subset of communication protocol rules associated with a second vehicle resource (e.g., a second OEM platform; a second vehicle operating on a second OEM platform; etc.).

Translating vehicle requests into one or more resource queries can additionally or alternatively include routing one or more vehicle requests to one or more adapter modules; and/or translating the vehicle requests with the adapter modules. The adapter modules can be associated with one or more protocols, vehicle resource identifiers, vehicle parameters, and/or any other suitable data. For example, translating a vehicle request can include identifying the vehicle resource identifier associated with the vehicle request, routing the vehicle request to an adapter module of a set of adapter modules based on the vehicle resource identifier; and translating the vehicle request at the adapter module. However, translating vehicle requests with an adapter module can be otherwise performed. Additionally or alternatively, translating vehicle requests based on protocols can be performed in any suitable manner. Further, generating and/or transmitting the resource query can be performed in any suitable manner.

Receiving vehicle data from a vehicle resource S135 functions to passively receive vehicle data (e.g., in a push paradigm where the vehicle resource is pushing vehicle data to the system). Vehicle data can be received at any suitable time (e.g., at predetermined time intervals; automatically in response to events such as a vehicle starting; based on request rules, etc.) at any suitable frequency. Receiving vehicle data can include receiving a system access token (e.g., granting write access) with the vehicle data from the vehicle resource, where the system can store the vehicle data in response to verifying the system access token. Such system access tokens can be generated by the system and distributed to vehicle resources and/or any suitable entity transmitting vehicle data to the system. However, receiving vehicle data can be performed in any suitable manner.

In a first variation of S130, determining parameter values can include obtaining vehicle data and/or other suitable data from the API subsystem (e.g., storing historic, current and/or predicted vehicle data). In this variation, vehicle data can be automatically transmitted from the vehicle resource (e.g., in a push paradigm as in S135; at a predetermined frequency; in response to fulfillment of a resource query by the API subsystem; as the data is generated; etc.) to the API subsystem and stored (e.g., cached) in the API subsystem (e.g., as the data is received, etc.). The vehicle data can be sampled at the vehicle, which can transmit the vehicle data to the API subsystem directly or indirectly (e.g., through an OEM platform). Additionally or alternatively, vehicle data can be automatically retrieved from the vehicle resource(s) by the system (e.g., in a pull paradigm as in S131; at a predetermined frequency; etc.) and stored in the API subsystem. The predetermined frequency (e.g., for receiving, retrieving, and/or storing vehicle data) can be user determined, automatically determined (e.g., based on historic third party requests for the information), and/or otherwise determined. Storing (e.g., caching) data at the API subsystem can be based on any one or more of: temporal parameters (e.g., when to store, how frequently to store, etc.), data parameters (e.g., amount of data to store, types of data to store, etc.), request rules (e.g., variable limit rules, where more data is stored for vehicle parameters associated with vehicle limit rules limiting the amount of data that can be retrieved for the vehicle parameters, etc.), permission settings (e.g., storing only the vehicle parameters permitted to be accessed by the client systems associated with a vehicle identifier), access tokens, and/or any suitable limiting information. Vehicle data is preferably stored at a remote system (e.g., the API subsystem) distinct from the vehicle resource (e.g., OEM platform) from which the vehicle data is received, but can be stored at any suitable component. Stored (e.g., cached) data can be deleted after a predetermined time (e.g., at scheduled time intervals), at an automatically determined time (e.g., in response to lack of storage space; user account deletion; etc.), based on preferences (e.g., client preferences, where a scheduled deletion can be skipped in response to a client preference to retain the vehicle data, which can be subsequently processed and/or transmitted to the client system), and/or at any suitable time. However, obtaining vehicle data from an API subsystem can be otherwise performed.

In a second variation of S130, determining parameter values can be based on request rules. For example, generating a resource query (e.g., in a pull paradigm) can include combining a plurality of vehicle requests into a single resource query for a vehicle resource associated with a variable limit request rule limiting the number of queries accepted by the vehicle resource for a time period. In another example, the method 100 can include querying the vehicle resource for a state-of-charge of a vehicle, where transmitting the first resource query is in response to the state-of-charge exceeding a threshold. In another example, receiving vehicle data (e.g., in a push paradigm) from a vehicle resource can be based on endpoint rules (e.g., established by OEM platforms), where vehicle data received from a first vehicle (e.g., manufactured by a first OEM) can be for a first subset of vehicle parameters, and vehicle data received from a second vehicle (e.g., manufactured by a second OEM) can be for a second subset of vehicle parameters distinct from the first subset. In another example, determining parameter values can be based on request scheduling rules (e.g., batching vehicle requests to fulfill; prioritizing query generation and/or transmission for different vehicle requests based on client credits and/or status; only querying when vehicle is connected to WiFi; etc.). In another example, determining parameter values can include evaluating a network strength of the vehicle resource to the remote system (e.g., where the vehicle resource pushing the vehicle data is based on the network strength exceeding a threshold; where the vehicle resource rejecting the resource query by is based on the network strength below a threshold; where the vehicle resource accepting the resource query is based on the network strength above the threshold; etc.). However, determining parameter values based on request rules can be performed in any suitable manner.

In a third variation of S130, determining parameter values can be performed differently based on one or more of: resource query transmission (e.g., acceptance of the resource query by the vehicle resource, rejection, etc.), request rules associated with the vehicle request, requested vehicle parameters (e.g., type of vehicle parameter), client preferences included in the vehicle request (e.g., a client using additional request credits to ensure data retrieval through querying the vehicle resource for up-to-date vehicle data rather than by retrieval of cached vehicle data from the API subsystem), and/or any suitable criteria. For example, determining parameter values for fulfilling a vehicle request can be based on acceptance or rejection of a resource query transmitted to a vehicle resource. In a specific example, the method 100 can include storing (e.g., caching) a first value for a vehicle parameter (e.g., stored in association with a vehicle identifier at a remote system); in response to the vehicle resource accepting the resource query, receiving a second value (e.g., sampled after the first value) for the vehicle parameter (e.g. at the remote system from the vehicle resource); in response to the vehicle resource rejecting the resource query (e.g., due to the vehicle being turned; OEM platform unreachable; OEM platform request maximum reached; etc.), retrieving the first value (e.g., from the cache at the remote system); and transmitting at least one of the first and the second values to the requesting party. In another example, scheduled resource query generation and/or transmission can be skipped (e.g., in response to a recent historical resource query to the same vehicle resource for the same vehicle parameter, where the recent historical resource query is associated with a timestamp within a threshold duration of a timestamp associated with the scheduled resource query generation and/or transmission, etc.). In another example, determining parameter values can be performed differently for different vehicle parameters requested by a multi-parameter request (e.g., generating a first resource query specific to a first vehicle resource associated with a first requested vehicle parameter, and generating a second resource query specific to a second vehicle resource associated with a second requested vehicle parameter). In another example, for an OEM platform allowing push and pull paradigms for vehicle data transmission, vehicle data can be regularly pushed (e.g., at predetermined time intervals), and vehicle data can be pulled in response to vehicle requests. In another example, values for vehicle parameters associated with a high sampling frequency relative to other vehicle parameters can be pulled (e.g., in order to retrieve up-to-date values), and values for vehicle parameters associated with low sampling frequency can be obtained from storage (e.g., API subsystem cache). However, determining parameter values can be performed in any suitable manner.

Fulfilling the vehicle request with the parameter value S140 functions to return the requested information to the requesting party (e.g., a third party application). Fulfilling the vehicle request preferably includes transmitting the parameter value and/or higher-level parameter data (e.g., generated based on the parameter value) to the client. Additionally or alternatively, the parameter values can be transmitted to a fourth party, specified by the third party and/or authorized by the system. The parameter values can be transmitted in response to receipt of the vehicle request, in response to client access verification, at a predetermined frequency, in response to parameter value determination, or at any other suitable time. The parameter values are preferably transmitted by the API subsystem, but can be transmitted by any suitable component (e.g., directly from the vehicle resource to the client system, etc.), and/or by any other suitable system. For example, directly transmitting the parameter value from the vehicle resource to the requesting party (e.g., client system) can include transmitting instructions to the vehicle resource (e.g., from the API subsystem), where the instructions can specify one or more of: requesting party address (e.g. client URI), processing instructions (e.g., for transforming the data into higher-level parameter data, etc.), transmission instructions (e.g., for direct transmission to the requesting party), and/or any other suitable guidance. However, transmitting vehicle data can be performed in any suitable manner.

The method 100 can additionally or alternatively include connecting the system (e.g., API subsystem, authorization subsystem, management subsystem, etc.) to one or more vehicle resources (e.g., vehicles) S150, which functions to grant the system access to the vehicle resource, such that the system can remotely receive and/or retrieve vehicle data from the vehicle resource, and/or control vehicle operation. Connecting the system to a vehicle resource can additionally or alternatively function to: associate vehicle identifiers with user identifiers, determine and store user credentials associated with the vehicle resource (e.g., user credentials for logging into an OEM platform), and/or determine any other suitable information for vehicle resource connection and/or data retrieval.

In a first variation, connecting the system to a vehicle resource can include receiving a vehicle identifier from a user device (e.g., from a user at a user device). The vehicle identifier can be a VIN, a license plate number, another unique vehicle identifier, the vehicle make, the vehicle model, and/or any other suitable identifying information. The user device can additionally provide OEM login credentials, vehicle login credentials, and/or any other suitable set of login credentials. In an example, the system can automatically determine the OEM associated with the unique vehicle identifier (e.g., based on an external database, empirically through trial-and-error, etc.), and send a request to the respective OEM platform to connect to the vehicle, including the user identifier, unique vehicle identifier, and/or any associated login credentials. The OEM platform can: provide an address for the vehicle, where the system can directly connect to the vehicle; provide confirmation that the system can receive data generated by the vehicle and/or send commands to the vehicle through the OEM platform; and/or respond in any other suitable manner. However, connecting the system to a vehicle resource based on the vehicle identifier can be performed in any suitable manner.

Figure 7:
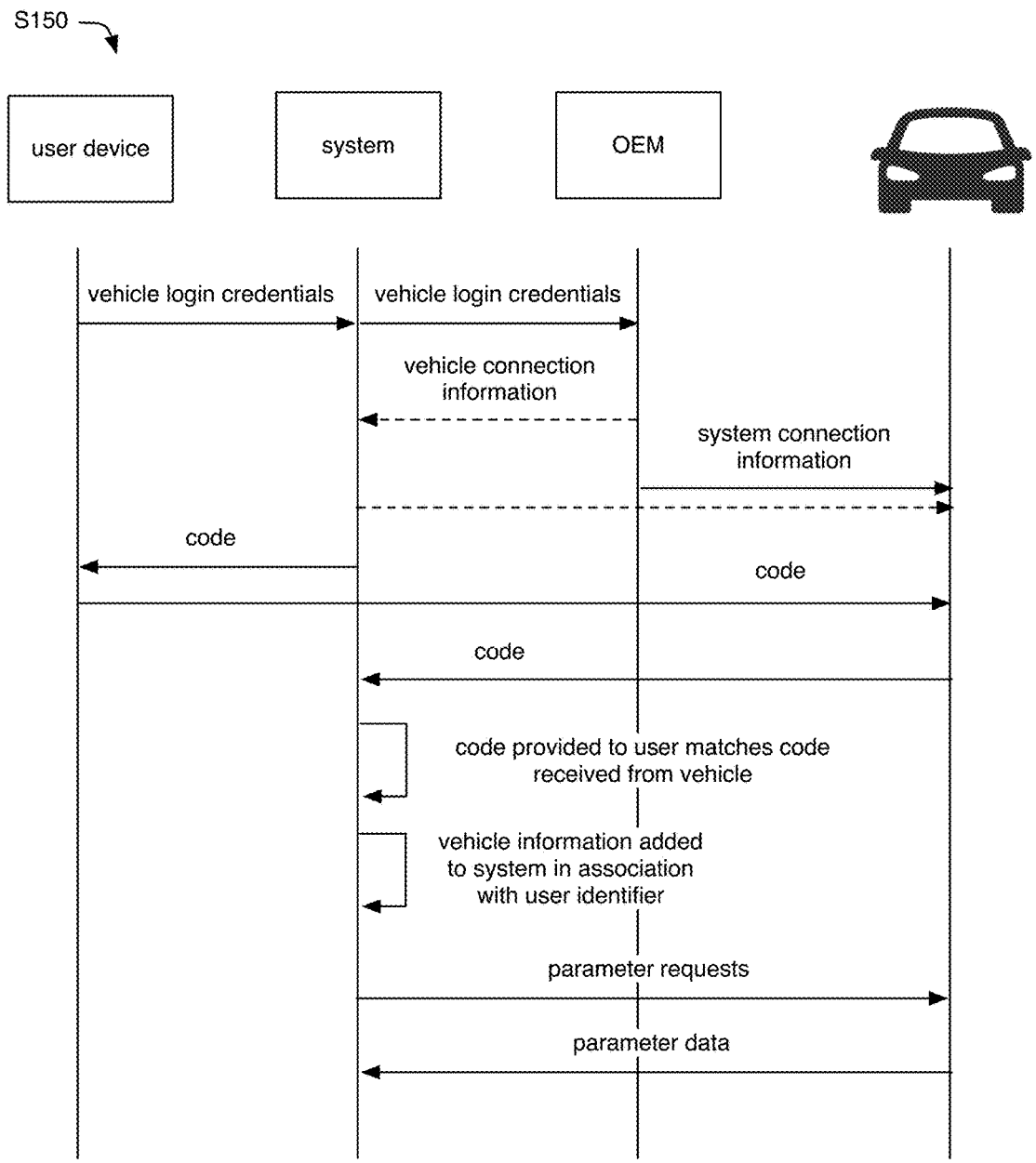
FIG. 7 is a schematic representation of a specific example of vehicle connection to the system.
Figure 8:
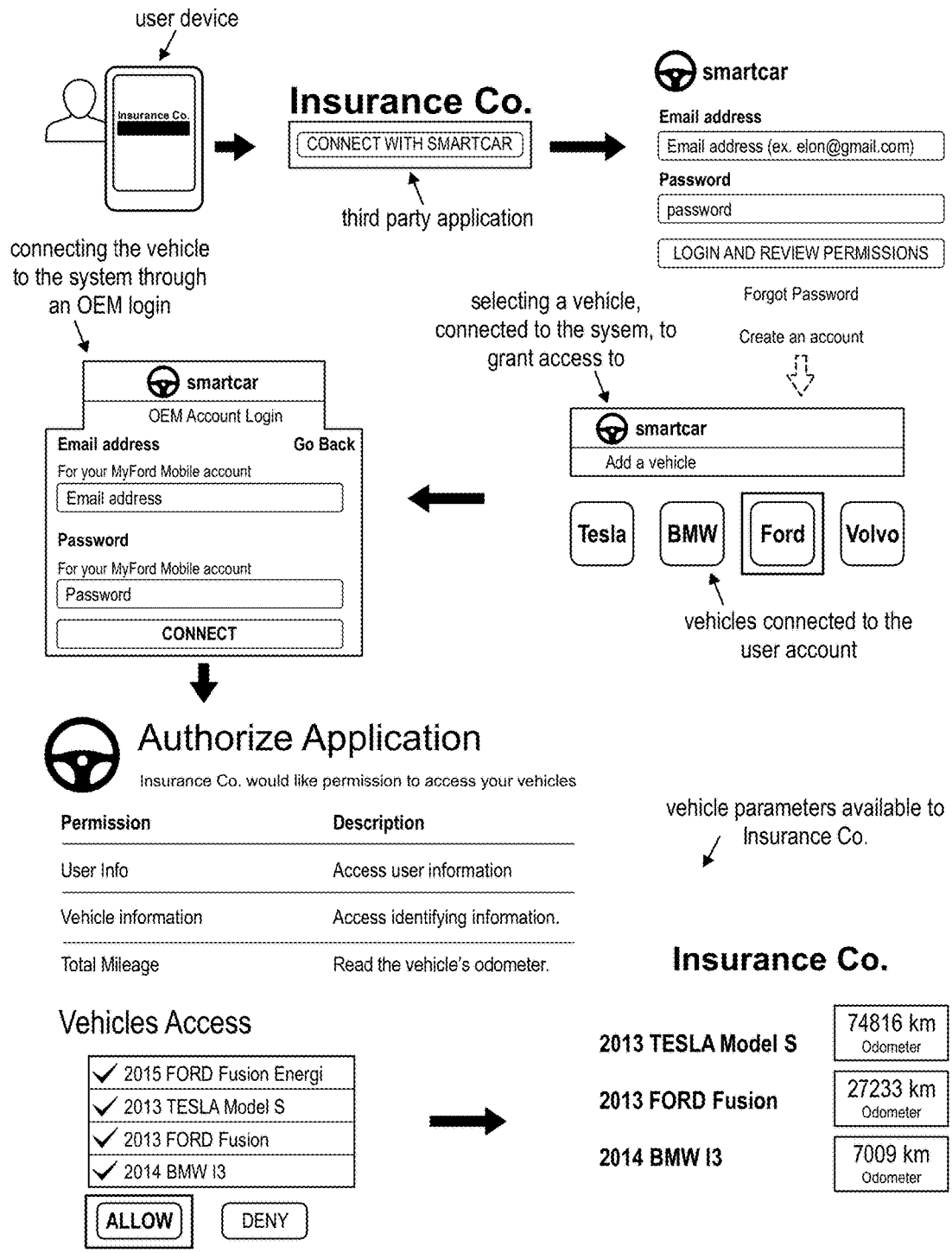
FIG. 8 is a flow representation of a specific example of a user interface for granting the third party access to the vehicle parameters.

In one embodiment of the first variation, connecting the system to a vehicle resource can additionally or alternatively include implementing two-factor authentication after user-vehicle association is confirmed (e.g., by the OEM platform). In a first specific example of the embodiment, two-factor authentication can include sending a code (e.g., sending an authentication code from a remote system) to the user device and/or a second device associated with a use identifier (e.g., stored at the remote system); receiving the code at the vehicle from the user; transmitting the code (e.g., and a vehicle identifier) from the vehicle (e.g., to the remote system); and associating the vehicle information and/or vehicle identifier with the user identifier in the system in response to receipt of the code at the vehicle (example shown in FIG. 7). Alternatively, the code can be sent to and displayed by a vehicle display, where the vehicle identifier is added to the system when the code is entered into and received from a user device associated with the system (e.g., executing an application associated with the system, executing a third party application, etc.). In a second specific example of the embodiment, the vehicle identifier identifying the vehicle can be added to the system in response to user device connection with a local vehicle network (e.g., a Bluetooth network, etc.), where the user device is associated with the system. In a third specific example of the embodiment, a pattern of actions can be sent to the user device (e.g., opening the driver's side window, turning on the engine, then opening the trunk), where the vehicle identifier can be added to the system in response to determination that the pattern has been performed on the vehicle. Additionally or alternatively, physical user access to the vehicle can be otherwise verified. However, implementing multi-factor authentication to connect the system to a vehicle resource can be performed in any suitable manner.

In a second variation, connecting the system to a vehicle resource can include: receiving a vehicle identifier from a user device associated with a user identifier, and determining that the user device has connected to a vehicle identified by the vehicle identifier. For example, the user can enter a VIN, the system can automatically determine a hidden vehicle identifier based on the VIN (e.g., from the OEM), and add the vehicle to the system in response to connection of a user device (associated with the system) with a local network of the vehicle, where the user device can receive the hidden vehicle identifier from the vehicle through the local network.

In a third variation, connecting the system to a vehicle resource can include: receiving OEM platform login credentials from a user, logging into the OEM platform using the provided credentials, and receiving vehicle connection information (e.g., login credentials, address, etc.) from the OEM platform.

In a fourth variation, connecting the system to a vehicle resource can include processing access requests to the system (e.g., system access requests), generating and/or transmitting access requests to the vehicle resource (e.g., resource access requests), and/or performing any suitable operation in relation to access requests for retrieving data from, inputting data to, and/or otherwise accessing a system (e.g., API subsystem, client system, vehicle resource, etc.). For example, the method 100 can include receiving a system access request from a client system (e.g., third party application); in response to verifying the system access request, transmitting the system access token to the client system, and associating an identifier (e.g., user identifier) with a client identifier identifying the client system. In another example, the method 100 can include transmitting a resource access request to a vehicle resource (e.g., OEM platform); in response to verification of the resource access request by the vehicle resource, receiving the resource access token from the vehicle resource and storing the resource access token in association with an identifier (e.g., user identifier). Additionally or alternatively, processing access requests can be performed in any suitable manner. However, the system can be otherwise connected to a vehicle resource.

The method 100 can additionally or alternatively include controlling a vehicle based on a vehicle command 160, which functions to transform the vehicle into a different state (e.g., from an off-state to a remotely-controlled state) in accordance with the vehicle command. Controlling the vehicle is preferably based on a vehicle command (e.g., to operate the vehicle) received in a vehicle request (e.g., by a client system, by a user attempting to remotely control their one or more vehicles, etc.), but can be based on vehicle commands received in any suitable form. Controlling the vehicle preferably includes generating control instructions (e.g., including control values according to which the vehicle can be operated, etc.) based on the vehicle command, but can additionally or alternatively be based on any suitable data (e.g., request rules, network strength between the vehicle and the remote system, etc.). Controlling the vehicle preferably includes transmitting control instructions to the vehicle (e.g., based on a vehicle identifier specifying an IP address associated with the vehicle) for execution by the vehicle (e.g., thereby transforming the vehicle to a different state). Additionally or alternatively, controlling the vehicle can include executing, at the vehicle, control instructions generated based on one or more vehicle commands (e.g., thereby operating the vehicle based on the control instructions). However, controlling the vehicle with control instructions can be otherwise performed. In an example, the method 100 can include leveraging a computing system to perform calculations and comparisons (e.g., verifying client access to vehicle control by comparing the redirection URI to the sending URI associated with an access token included in the vehicle request as in S120; translating the vehicle request into control instructions as in S130; etc.); and automatically controlling operation of the vehicle in response to the calculations and comparisons satisfying a condition (e.g., successful verification of client access; successful determination of safe vehicle control conditions based on retrieved vehicle data; etc.). In another example, generating control instructions for operating one or more vehicles can include translating a vehicle request including a vehicle command based on a protocol (e.g., a vehicle-specific and/or OEM-specific protocol). Additionally or alternatively, translating a vehicle command can be otherwise performed. Controlling the vehicle can be partially and/or fully performed at the remote system (e.g., for generating and transmitting the control instructions) and/or at the vehicle (e.g., for executing the control instructions with a processing system of the vehicle), but can be performed at any suitable component. Controlling a vehicle can additionally or alternatively include receiving a confirmation that the control instructions associated with a vehicle command was received by a vehicle; receiving a confirmation that the vehicle was operated based on the vehicle command; receiving vehicle data indicative of vehicle command execution by the vehicle; and/or receiving any other suitable data from the vehicle subsequent to transmitting control instructions. However, controlling the vehicle can be performed in any suitable manner.

The method 100 can additionally or alternatively include updating system information Silo, which functions to update components of the system (e.g., authorization subsystem, management subsystem, API subsystem, etc.) in response to changes made by an OEM, user, client, and/or any other suitable party. Updating system information can include updating any one or more of: access tokens (e.g., in response to receiving new permission settings from an OEM, user, and/or other suitable entity; in response to verifying access to a vehicle parameter for a new third party application, etc.), associations (e.g., associating a user identifier with a new vehicle identifier in response to verifying the association between the user and the new vehicle, etc.), operations performed in translating a vehicle request to a resource query (e.g., updating the OEM-specific protocol rules in response to an update to the associated OEM platform), models (e.g., for dynamically determining when and/or how to generate and/or transmit a resource query; for scheduling processing of vehicle requests; etc.), vehicle parameters (e.g., in response to an update of a vehicle operating system by the OEM), request credits (e.g., in response to fulfillment of a vehicle request, etc.), and/or any suitable components. In a variation, updating system information can include updating one or more access tokens (e.g., replacing access tokens, generating new access tokens, transmitting and/or receiving new access tokens, etc.). Access tokens can be associated with an expiration time at which the access token becomes invalid for accessing the target system, but can alternatively be time-agnostic (e.g., providing indefinite access). Updating access tokens can be in response to receiving and/or transmitting a new access request (e.g., receiving a new system access request from a client system; transmitting a new resource access request to a vehicle resource, etc.), detecting an expiration time within a threshold duration of a current time (e.g., notifying a client system that a system access token associated with the client system is about to expire; automatically transmitting a resource access request to a vehicle resource in response to a current time within a day of an expiration time for a resource access token, etc.), in response to an update of other system information (e.g., in response to a client system updating an associated third party application; in response to an vehicle resource updating protocols, etc.), and/or performed at any suitable time. However, updating system information can be performed in any suitable manner.

Any portions of the method 100 and/or instances of a portion of the method 100 can be performed in serial (e.g., in response to, etc.), parallel (e.g., concurrently on different threads for parallel computing to improve system processing ability for fulfilling vehicle requests, etc.), and/or with any suitable temporal relationship. For example, for a vehicle request requesting vehicle parameters in association with different OEM platforms operating on different OEM-specific communication protocols, the method 100 can include grouping requested vehicle parameters by OEM platform; concurrently generating different queries for the different OEM platforms based on the groupings of requested vehicle parameters; and concurrently transmitting the different queries to the different OEM platforms.

The embodiments include every combination and permutation of the various system components and the various method 100 processes, including any variations, examples, and specific examples.

An alternative embodiment preferably implements the above methods in a computer-readable medium storing computer-readable instructions. The instructions are preferably executed by computer-executable components preferably integrated with a vehicle data management subsystem. The vehicle data management subsystem can include a communication system (e.g., cellular, WiFi, etc.), resource system, and a profile system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for processing requests for vehicular data, the method comprising:
    sampling a first value for a vehicle parameter at a vehicle at a first time;
    transmitting the first value from the vehicle to a remote system;
    at the remote system, caching the first value in association with a vehicle identifier identifying the vehicle;
    at the remote system, receiving a first vehicle request for the vehicle parameter from a first third party application, the first vehicle request comprising the vehicle identifier and a system access token;

at the remote system, verifying, based on the system access token, first third party application access to the vehicle parameter for the vehicle identifier;

at the remote system, in response to verifying first third party application access to the vehicle parameter for the vehicle identifier, transmitting a resource query for the vehicle parameter to a vehicle resource associated with the vehicle identifier, wherein the first resource query comprises a resource access token;

in response to the vehicle resource accepting the resource query based on the resource access token, transmitting a second value for the vehicle parameter from the vehicle resource to the remote system, the second value sampled at the vehicle at a second time after the first time;

in response to the vehicle resource rejecting the resource query, retrieving the first value at the remote system; and at the remote system, fulfilling the first vehicle request, wherein fulfilling the first vehicle request comprises transmitting at least one of the first value and the second value from the remote system to the third party application.

2. The method of claim 1, further comprising, at the remote system:

receiving a second vehicle request comprising a vehicle command and the vehicle identifier;

generating control instructions based on the vehicle command;

transmitting the control instructions to the vehicle based on the vehicle identifier; and operating the vehicle based on the control instructions.

3. The method of claim 1, further comprising, at the remote system:

storing the vehicle identifier in association with a first permission setting for the first third party application, the first permission setting granting access to the vehicle resource; and storing the vehicle identifier in association with a second permission setting for a second third party application, the second permission setting different from the first permission setting.

4. The method of claim 1, further comprising:

transmitting a code from the remote system to a user device associated with a user identifier stored at the remote system;

receiving the code at the vehicle from the user;

transmitting the code and the vehicle identifier from the vehicle to the remote system; and in response to receiving the code at the remote system, storing the vehicle identifier in association with the user identifier.

5. The method of claim 1, wherein the vehicle resource is physically separate and remote from the vehicle.

6. The method of claim 5, further comprising, at the remote system: evaluating a network strength of a wireless communication network communicably connecting the vehicle resource and the vehicle to the remote system, wherein the vehicle resource rejecting the resource query comprises the vehicle resource rejecting the resource query in response to is based on the network strength falling below a threshold, and wherein the vehicle resource accepting the resource query comprises the vehicle resource accepting the resource query in response to is baded on the network strength falling above the threshold.

7. The method of claim 1, wherein the first vehicle parameter comprises a location parameter, and wherein fulfilling the vehicle request comprises:

at the remote system, retrieving historic location parameter values for the vehicle, the historic location parameter values comprising at least one of the first value and the second value for the location parameter;

retrieving historic odometry values associated with the historic location parameter values for the vehicle;

determining a proportion of travelled miles within a geographic region, relative to total miles driven, based on the historic location parameter values and historic odometry values; and transmitting the proportion to a taxing entity system associated with the third party application.

8. A method for processing requests for vehicular data, the method comprising at a remote system:

receiving a first value for a first vehicle parameter from a first vehicle resource, the first value sampled by a first vehicle at a first time;

caching the first value in association with a first vehicle identifier identifying the first vehicle;

receiving a first vehicle request for the first vehicle parameter from a first third party application, the first vehicle request comprising the first vehicle identifier;

in response to verifying first third party application access to the first vehicle parameter associated with the first vehicle identifier, transmitting a resource query for the first vehicle parameter to a first vehicle resource associated with the first vehicle identifier, wherein the resource query comprises a first resource access token;

receiving a second value for the first vehicle parameter from the first vehicle resource after the first vehicle resource accepts the resource query based on the first resource access token, wherein the second value is sampled at the first vehicle at a second time after the first time;

retrieving the first value at the remote system after the first vehicle resource rejects the resource query; and transmitting at least one of the first value and the second value from the remote system to the first third party application.

9. The method of claim 8, wherein the first vehicle request further comprises a system access token, wherein first third party application access is verified based on the system access token.

10. The method of claim 9, further comprising, prior to receiving the first vehicle request at the remote system:

receiving a system access request from the first third party application; and transmitting the system access token from the remote system to the third party application.

11. The method of claim 8, further comprising, at the remote system, generating the first resource query from the first vehicle request.

12. The method of claim 11, wherein generating the first resource query from the first vehicle request comprises translating the first vehicle request into the first resource query with an adapter module associated with the first vehicle resource.

13. The method of claim 12, wherein the first vehicle request is translated into the first resource query based on a first subset of communication protocol rules associated with the first vehicle resource.

14. The method of claim 8, wherein the first resource access token is stored in association with a first user identifier, wherein the first user identifier is associated with the first vehicle identifier.

15. The method of claim 14, wherein the first user identifier is stored in association with a second resource access token granting access to a second vehicle resource, different from the first vehicle resource.

16. The method of claim 15, wherein the first resource access token is associated with a first permission level granting access to the first vehicle parameter at the first vehicle resource, and wherein the second resource access token is associated with a second permission level granting access to a second vehicle parameter at the second vehicle resource.

17. The method of claim 15, wherein the first vehicle request for the first vehicle parameter further comprises a second vehicle identifier, the second vehicle identifier associated with the second vehicle resource.

18. The method of claim 17, further comprising, at the remote system: generating the first resource query, comprising the first resource access token, based on a first subset of communication protocol rules associated with the first vehicle resource; and generating a second resource query, comprising the second resource access token, based on a second subset of communication protocol rules associated with the second vehicle resource.

19. The method of claim 11, further comprising, at the remote system, receiving a second vehicle request from the first third party application, the second vehicle request comprising a second vehicle parameter associated with the first vehicle identifier.

20. The method of claim 19, wherein generating the first resource query further comprises aggregating the first and the second vehicle parameters requested in the first and the second vehicle requests and translating the aggregated vehicle requests into a single resource query comprising the first resource access token.

\* \* \* \* \*

UNITED STATES PATENT AND TRADEMARK OFFICE
CERTIFICATE OF CORRECTION

PATENT NO. : 10,169,825 B2
APPLICATION NO. : 15/828964
DATED : January 1, 2019
INVENTOR(S) : Katta et al.

It is certified that error appears in the above-identified patent and that said Letters Patent is hereby corrected as shown below:

In the Claims

In Column 21, Line 63, in Claim 6, after "to", delete "is based on"
In Column 21, Line 66, in Claim 6, after "to", delete "is baded on"

In Column 24, Line 2, in Claim 18, after "system:", insert --¶--
In Column 24, Line 5, in Claim 18, after "and", insert --¶--

Signed and Sealed this
Thirty-first Day of December, 2019

Andrei Iancu
*Director of the United States Patent and Trademark Office*